(12) United States Patent
Wolff et al.

(10) Patent No.: US 9,296,428 B2
(45) Date of Patent: Mar. 29, 2016

(54) MOTOR VEHICLE BODY

(71) Applicant: GM GLOBAL TECHNOLOGY OPERATIONS LLC, Detroit, MI (US)

(72) Inventors: Stefan Wolff, Hochheim (DE); Joachim Schaefer, Darmstadt (DE); Uwe Schmitz, Nauheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 13/692,796

(22) Filed: Dec. 3, 2012

(65) Prior Publication Data

US 2013/0341968 A1  Dec. 26, 2013

(30) Foreign Application Priority Data

Dec. 3, 2011  (DE) .................. 10 2011 120 122

(51) Int. Cl.
*B62D 25/08* (2006.01)
*B62D 25/14* (2006.01)

(52) U.S. Cl.
CPC ............ *B62D 25/081* (2013.01); *B62D 25/145* (2013.01)

(58) Field of Classification Search
CPC ........................... B62D 25/081; B62D 25/145
USPC ................................................... 296/192, 70
See application file for complete search history.

(56) References Cited

U.S. PATENT DOCUMENTS

| | | | |
|---|---|---|---|
| 6,193,304 B1 | 2/2001 | Takahashi et al. | |
| 7,004,534 B2 | 2/2006 | Yoshii et al. | |
| 7,287,618 B2 | 10/2007 | Okamoto et al. | |
| 7,766,417 B2 | 8/2010 | Kannan et al. | |
| 8,308,224 B2 | 11/2012 | Ishii et al. | |
| 8,528,964 B2* | 9/2013 | Walter et al. | 296/187.04 |
| 2007/0102222 A1* | 5/2007 | Tanaka | 180/291 |
| 2008/0284208 A1 | 11/2008 | Kannan et al. | |
| 2012/0056446 A1* | 3/2012 | Stojkovic et al. | 296/192 |

FOREIGN PATENT DOCUMENTS

| | | |
|---|---|---|
| DE | 102006029921 A1 | 1/2008 |
| DE | 102007017427 A1 | 11/2008 |
| DE | 102009032855 A1 | 1/2010 |
| DE | 102010005834 A1 | 7/2011 |
| EP | 327415 A1 * | 8/1989 |
| EP | 1810892 A1 | 7/2007 |
| EP | 1810893 A1 | 7/2007 |

OTHER PUBLICATIONS

German Patent Office, German Search Report for Application No. 10 2011 120 122.3 dated Jul. 24, 2012.

* cited by examiner

*Primary Examiner* — Glenn Dayoan
*Assistant Examiner* — Melissa A Black
(74) *Attorney, Agent, or Firm* — Ingrassia Fisher & Lorenz PC

(57) ABSTRACT

A motor vehicle body is provided. The motor vehicle body includes a plate-like, three-dimensionally shaped cross member, of which a first flange supports a front, lower edge region of a windshield, and a second flange is supported against a structural element of the body. The cross member further encompasses a spacer that joins the two flanges and is elongated in the transverse direction of the vehicle, and which exhibits a sectional profile that extends horizontally along a straight line over the entire length of the cross member.

22 Claims, 2 Drawing Sheets

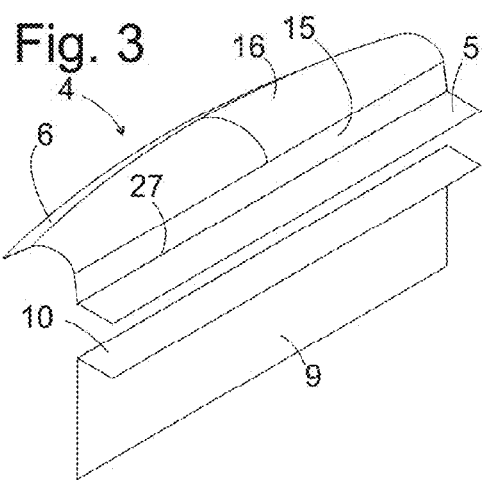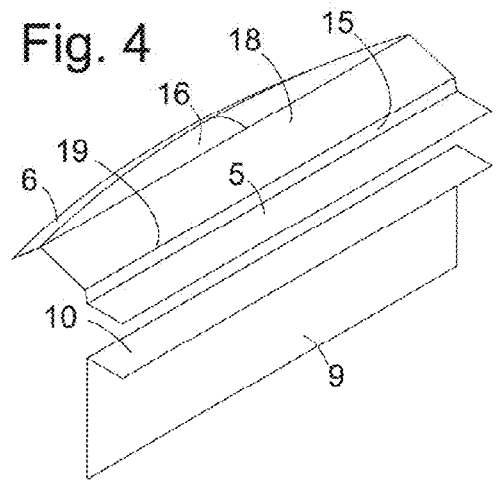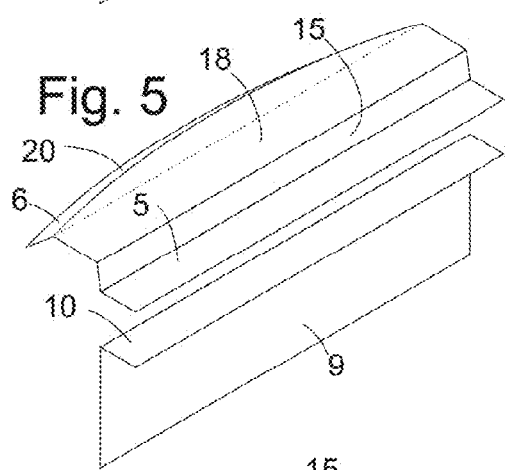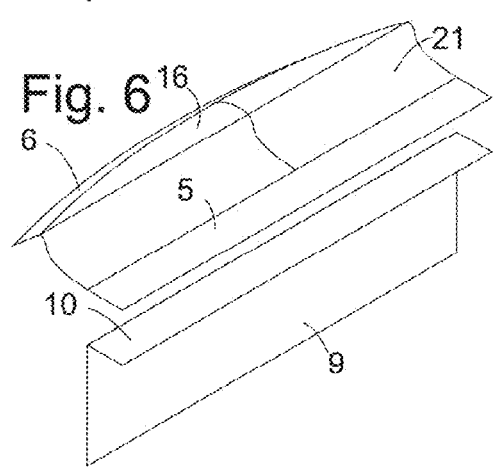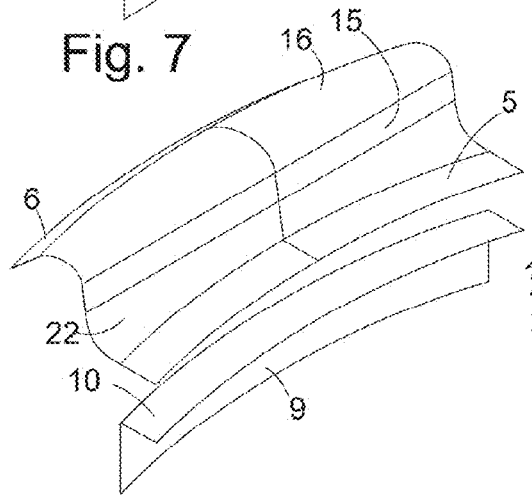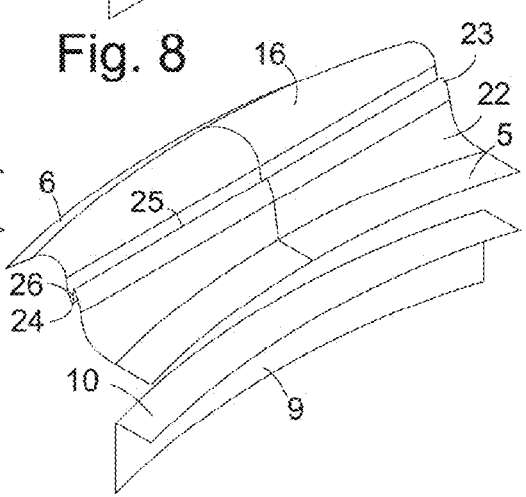

MOTOR VEHICLE BODY

CROSS-REFERENCE TO RELATED APPLICATION

This application claims priority to German Patent Application No. 10 2011 120 122.3, filed Dec. 3, 2011, which is incorporated herein by reference in its entirety.

TECHNICAL FIELD

The present disclosure relates to a motor vehicle body with a windshield, which is supported against a structural element of the body by way of a deformable cross member.

BACKGROUND

Made known by EP1810892 B1 was a motor vehicle body in which the structural element is an arced strut with a convex side facing the engine compartment that extends between the engine compartment and passenger cabin, and the cross member is a profile resembling a gutter, in which the open side of the gutter faces the passenger cabin, an upper lateral wall of the gutter supports a front lower edge region of the windshield, and a lower lateral wall of the gutter lies on the cross strut. If contact is made with a pedestrian in traffic and his or her head impacts the windshield, the cross member is clinched, i.e., the upper and lower lateral walls of the gutter move toward each other, while an area of the gutter lying in between must evasively move in the direction of the engine compartment. This conventional cross member also has a curved shape when viewed from above, so that such an evasive forward movement can only take place given a simultaneous expansion of the diverting material or, if the material is too strong for such an expansion, the evasive movement of a portion of the cross member directed toward the engine compartment must be offset by an inward motion in the direction of the passenger cabin in other portions of the transverse member. High forces may be required to unleash the shear deformations associated therewith on portions of the cross member, which is due to the fact that the cross member may exhibit a high deformation resistance in at least an initial phase of the head impact.

Thus, it may be desirable to provide a motor vehicle body with a cross member supporting a windshield, which reduces the chance of injury when a head impacts the cross member or the windshield it supports. In addition, other objects, desirable features and characteristics will become apparent from the subsequent summary and detailed description, and the appended claims, taken in conjunction with the accompanying drawings and this background.

SUMMARY

According to various exemplary embodiments, provided is a motor vehicle body with a windshield and a plate-like, three-dimensionally shaped cross member, which encompasses a first flange that supports a front, lower edge region of the windshield, a second flange supported against a structural element of the body, and a deformable spacer that joins the two flanges and is elongated in the transverse direction of the vehicle, by virtue of the fact that there exists at least one first sectional plane in which the spacer exhibits a sectional profile that extends horizontally along a straight line over the entire length of the cross member. The cross member can fold or bend at the location of such a straight sectional profile, without a higher and potentially even limitedly reproducible initial resistance having to be overcome for this purpose.

The cross member generally exhibits a zone of non-zero width, in which each sectional profile of the cross member extends substantially horizontally along a straight line over the entire length of the cross member in a sectional plane that intersects the cross member in this zone and is substantially parallel to the first sectional plane. Because the cross member is free of spherical curvature in this entire zone, this entire zone can continuously deform when exposed to an impacting head, and gradually decelerate the head in the process.

The lack of spherical curvature in the zone makes it possible to do without cutouts for influencing the deformation resistance of the zone. As a result, the cross member can also help keep disruptive odors and noises from the engine compartment out of the passenger cabin.

In one example, provided is a single cross member, which, in order to effectively support the lower edge region of the windshield and achieve a deformation resistance that is substantially uniform over the width of the windshield, should extend over at least three fourths of the width of the windshield, and generally over its entire width. However, it is also conceivable to consecutively arrange several cross members of the kind defined above in the widthwise direction of the windshield between its lower edge region and the structural element.

The spacer and in one example, its zone defined above that traces a straight line in the transverse direction of the vehicle can be curved in a second sectional plane substantially perpendicular to the first sectional plane, so as to form a one-piece, materially flush bond between the two flanges.

A contact surface on which the second flange and structural element touch each other can exhibit a straight delimitation on the side of the spacer, so as to help the cross member to fold along this delimitation in the case of a head impact. In one example, this type of delimitation can be formed by an edge of a flange of the structural element that supports the second flange; in this instance, the spacer can be an elongation of the second flange with a straight cross section. As an alternative, the delimitation can also be formed by a curvature of the cross member.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIG. 3 is a schematic, perspective view of the cross member from FIGS. 1 and 2 and the partition wall carrying it;

FIG. 4 is another exemplary embodiment of the cross member in a view analogous to FIG. 3;

FIG. 5 is another exemplary embodiment of the cross member;

FIG. 6 is another exemplary embodiment of the cross member;

FIG. 7 is another exemplary embodiment of the cross member; and

FIG. 8 is another exemplary embodiment of the cross member.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
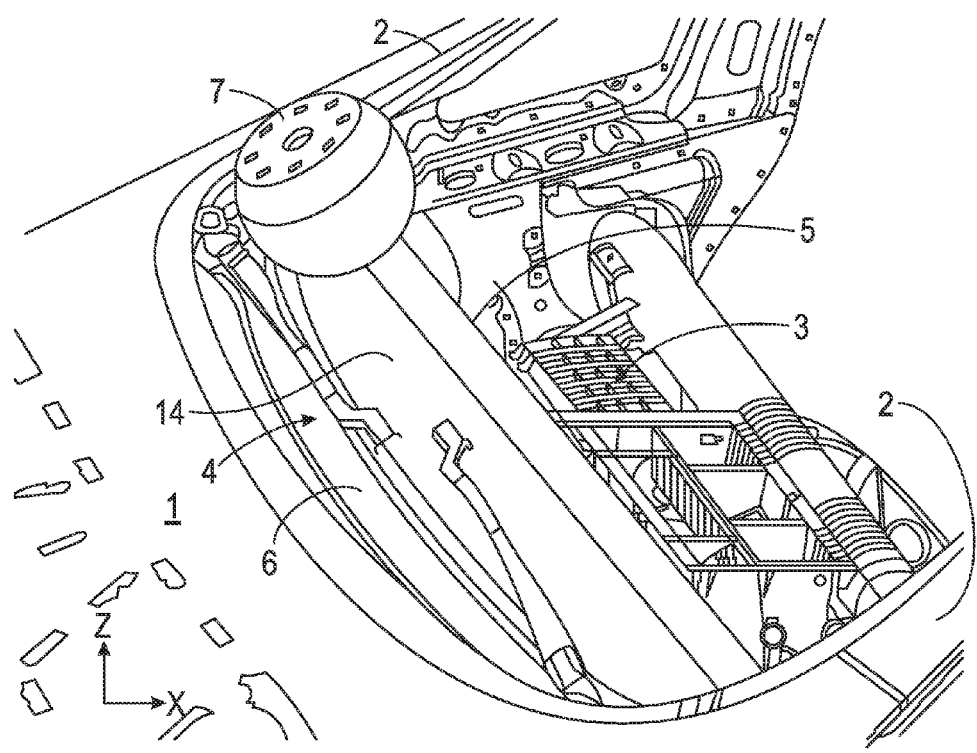
FIG. 1 is a perspective view of part of a motor vehicle body according to an exemplary embodiment of the present disclosure and an impactor simulating the impact by the head of a pedestrian on the body.

FIG. 1 shows a perspective view of part of a motor vehicle body, on which the present disclosure is implemented. Visible is the rear area of a front hood along with an adjoining window case that accommodates a windshield in a finished vehicle, flanked by A-columns. A dashboard panel extending under the windshield in a finished vehicle has been omitted on FIG. 1, so as to be able to illustrate the underlying fixtures 3 of the dashboard along with a cross member 4, which are concealed underneath the dashboard panel in a finished vehicle. The cross member 4 is shaped like a plate in the sense that it can be molded via the three-dimensional deformation of a blank comprised of flat material, in one example, by reshaping sheet steel. It is also conceivable to apply blanks comprised of fibrous material onto a matrix, so as to fabricate the cross member out of fiber-reinforced plastic. A rear flange 5 of the cross member 4 is supported on the upper edge of a partition wall not visible on the figure, which extends between the passenger cabin and engine compartment. The flange 5 is horizontally oriented and flat. A forwardly sloping front flange 6 of the cross member 4 is positioned to support a front lower edge of the windshield to be secured in the window case. The front flange 6 is bent in a sectional plane extending in the transverse direction of the vehicle to correspond to the curvature of the windshield. As a result of the varying shapes and orientations of the flange 5, 6, a closed-walled spacer 14 of the cross member 4 that joins it as a single piece is spherically curved at least in spots, and consequently hard to bend.

An impactor 7 depicted over the cross member 4 shows the position where, in a collision between a vehicle and an adult pedestrian of normal build, the latter impacts the front hood 1, his or her head striking the body. The point of impact is in a lower region of the windshield supported by the front flange 6 of the cross member 4. To ensure compliance with the legal head injury criterion (HIC) limits, the cross member must be able to yield under the impact.

Figure 2:
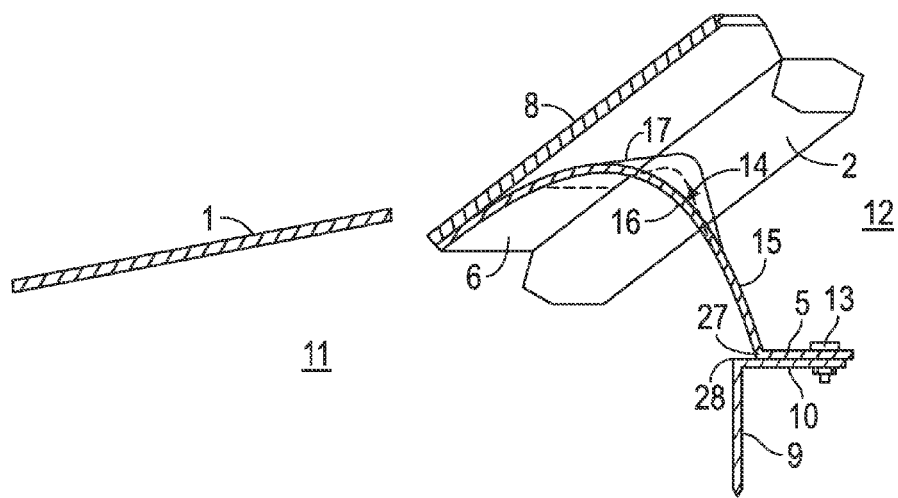
FIG. 2 is schematic cross section through the body parts depicted on FIG. 1 and its substructure.

FIG. 2 shows a schematic section that runs centrally through the cross member 4 and its environment in the longitudinal direction of the vehicle. The cross member 4 extends mirror symmetrically on both sides of the sectional plane. Visible around it is a rear region of the front hood 1 along with a respective portion of the windshield here marked 8 and the partition wall between the engine compartment 11 and passenger cabin 12 marked 9. Depicted in the background is a piece of one of the A-columns 2. Shown at an upper edge of the partition wall 9 is a horizontal locating surface 10, e.g., in the form of a flange bent away from the partition wall as a single piece toward the passenger cabin 12. The rear flange 5 of the cross member is attached over a large area of this locating surface 10, e.g., by means of several screws 13.

Proceeding from a knuckle line 27 on the front edge of the rear flange 5, the spacer 14 of the cross member 4 initially slopes upward along a straight line in a section 15, to subsequently transition into a uniformly curved vaulted section 16, which is in turn continuously adjoined by the front flange 6. The section 15 is flat, and extends substantially perpendicular to the sectional plane on the figure, as a result of which it exhibits a straight sectional profile in each sectional plane that extends through it in the transverse direction of the vehicle; the vaulted section 16 has a crown line 17 bent to reflect the curvature of the windshield 8 viewed from above, and its radius of curvature in a sectional plane perpendicular on the crown line 17 continuously tapers from the middle of the vaulted section 16 toward the A-columns 2.

Since the vaulted section 16 is curved in two spatial directions, i.e., spherically, there exists no sectional plane oriented in the transverse direction of the vehicle, in which the section 16 would have a straight sectional profile, and it exhibits rather a high resistance to deformation, even exposed to the impact delivered by the impactor 7. The dimensional stability of the planar section 15 is significantly lower by comparison thereto, so that the cross member 4 can yield to the impact generated by the impactor 7 by having the section 15 fold or bend, while largely retaining the shape of the vaulted section 16.

As a result of a variant not depicted, the locating surface 10 can be narrower than the one shown on FIG. 2, so that a portion of the flange 6 protrudes over the front edge 28 of the locating surface 6 toward the engine compartment, and can fold downward under the load of an impact.

FIG. 3 shows the partition wall 9 and the cross member 4 in a schematic, perspective view, which reveals the planar shape of the section 15, the front flange 6 resembling a conical envelope, and the spherical curvature of the vaulted section 16, which intensifies toward the ends.

It is possible to realize diverse modifications of the basic concept underlying the present disclosure, which involves providing a region with no spherical curvature extending over the entire width of the cross member 4 that is able to readily yield when exposed to an impact. For example, an additional, more shallowly ascending planar section 18 is inserted between the steeply ascending planar section 15 and the vaulted section 16 on FIG. 4, and can easily yield when exposed to an impact force acting from above by way of a swiveling motion, in one example, a reinforced bend along a knuckle line 19 between the sections 15, 18, and a potential diversion of the knuckle line 19 in the direction of the passenger cabin.

The width of the vaulted section 16 is here reduced to such an extent that the planar section directly borders the front flange 6 by way of a sharp bend at the edges of the cross member 4.

The variant on FIG. 5 can be derived from the one shown on FIG. 4 by widening the planar section 18 and front flange 6 along a respective continuing straight line until the width of the vaulted section disappears over the entire length of the cross member 4, i.e., the vaulted section is reduced on a curved knuckle line 20 between the planar section 18 and the front flange. While the planar section 18 is relatively easy to bend in its rear area facing the passenger cabin, where it extends along a substantially straight line over the entire width of the cross member 4, a front area of the section 18 lying on a windshield-facing side of an imaginary straight line that is shown dashed on FIG. 5 and connects the ends of the knuckle line 20 is relatively resistant to deformation, since there exists no sectional plane in front of these straight lines on which the longitudinal section of the cross member 4 runs along a substantially straight line over its entire length.

As shown on FIG. 6, the planar sections 15, 18 can also be replaced by a one-dimensionally curved section 21 that on average runs along a substantially straight line in the transverse direction of the vehicle.

FIG. 7 shows another modification of the cross member 4, which, as opposed to the ones described previously, exhibits a rear flange 5 that is bent like an arc when viewed from above, so that it can be mounted on a correspondingly curved partition wall 9 so as to economize on space. In the exemplary embodiment on FIG. 7, the vaulted section 16 and planar section 15 have the same shape as on FIG. 3; inserted between the planar section 15 and rear flange 5 is a spherically curved section 22, whose concave side faces the passenger cabin.

FIG. 8 shows another exemplary embodiment, in which the planar section 15 is replaced by a section 23 that on average exhibits an S-shaped curvature in the longitudinal direction of the vehicle, and on average runs along a straight line in the transverse direction of the vehicle. This section 23 can yield to an impact by having the front flange 6 and vaulted section 16 execute a linear downward motion, during which a lower crown line 24 of the S-contour approximates the vaulted section 16, and an upper crown line 25 approximates the section 22, while a region 26 lying between the crown lines 24, 25 simultaneously becomes wider and wider. In an extreme case, the crown lines 24, 25 can penetrate until into the spherically curved sections 16, 22, making it possible to delay the impact over a long distance.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A motor vehicle body, comprising:
    a passenger cabin;
    a windshield; and
    a plate-like, three-dimensionally shaped cross member including:
        a first flange that includes a first end and that supports a front, lower edge region of the windshield;
        a second flange that is supported against a structural element of the body; and
        a spacer that joins the second flange and the first flange and that is elongated in the transverse direction of the vehicle,
        wherein the spacer comprises a vaulted section that opens downwardly with respect to the windshield into the first flange such that the first end of the first flange points downward, and
        wherein there exists at least one first sectional plane in which the spacer exhibits a sectional profile that extends substantially horizontally along a straight line over the entire length of the cross member.

2. The motor vehicle body according to claim 1, wherein the cross member exhibits a zone of non-zero width, and each sectional profile of the cross member extends substantially horizontally along a straight line over the entire length of the cross member in a sectional plane that intersects the cross member in this zone and is substantially parallel to the first sectional plane.

3. The motor vehicle body according to claim 2, wherein the cross member is free of cutouts at least in the zone.

4. The motor vehicle body according to claim 1, wherein the cross member extends over more than three fourths of the width of the windshield.

5. The motor vehicle body according to claim 1, wherein the cross member extends over the entire width of the windshield.

6. The motor vehicle body according to claim 1, wherein the spacer is curved in a second sectional plane substantially perpendicular to the first sectional plane.

7. The motor vehicle body according to claim 1, wherein a contact surface on which the second flange and structural element touch each other exhibits a straight delimitation on a side of the spacer.

8. The motor vehicle body according to claim 7, wherein the delimitation is formed by an edge of a flange of the structural element that supports the second flange.

9. The motor vehicle body according to claim 7, wherein the delimitation is formed by a curvature of the cross member.

10. A motor vehicle, comprising:
    a passenger cabin;
    a body including a windshield and a plate-like, three-dimensionally shaped cross member, the cross sectional member extending over more than three fourths of the width of the windshield and including:
        a first flange that includes a first end and that supports a front, lower edge region of the windshield;
        a second flange that is supported against a structural element of the body; and
        a spacer that joins the second flange and the first flange and that is elongated in the transverse direction of the vehicle,
        wherein the spacer comprises a vaulted section that opens downwardly with respect to the windshield into the first flange such that the first end of the first flange points downward, and
        wherein there exists at least one first sectional plane in which the spacer exhibits a sectional profile that extends substantially horizontally along a straight line over the entire length of the cross member.

11. The motor vehicle according to claim 10, wherein the spacer is curved in a second sectional plane substantially perpendicular to the first sectional plane.

12. The motor vehicle according to claim 10, wherein a contact surface on which the second flange and structural element touch each other exhibits a straight delimitation on a side of the spacer.

13. The motor vehicle according to claim 12, wherein the delimitation is formed by an edge of a flange of the structural element that supports the second flange.

14. The motor vehicle according to claim 12, wherein the delimitation is formed by a curvature of the cross member.

15. The motor vehicle body according to claim 1, wherein the vaulted section has a curvature opens downwardly with respect to the windshield.

16. The motor vehicle body according to claim 15, wherein the vaulted section has a crown line bent to reflect the curvature of the windshield and points toward the windshield.

17. The motor vehicle body according to claim 1, further comprising:
    a front hood, wherein the first end of the first flange points downward with respect to the front hood.

18. The motor vehicle according to claim 10, wherein the vaulted section has a curvature opens downwardly with respect to the windshield.

19. The motor vehicle according to claim 18, wherein the vaulted section has a crown line bent to reflect the curvature of the windshield and points toward the windshield.

20. The motor vehicle according to claim 10, further comprising:
   a front hood, wherein an end of the first flange points downward with respect to the front hood.

21. The motor vehicle body according to claim 1, wherein the vaulted section is uniformly curved and has a curvature that continuously tapers and that opens downwardly with respect to the windshield into the first flange such that the first end of the first flange points downward.

22. The motor vehicle according to claim 10, wherein the vaulted section is uniformly curved and has a curvature that continuously tapers and that opens downwardly with respect to the windshield into the first flange such that the first end of the first flange points downward.

\* \* \* \* \*